US008010893B2

(12) United States Patent
Koch et al.

(10) Patent No.: US 8,010,893 B2
(45) Date of Patent: Aug. 30, 2011

(54) ELECTRONIC DOCUMENT WITH SELECTIVELY EDITABLE FIELDS AND METHODS FOR SAME

(75) Inventors: Kevin Koch, Grand Junction, CO (US); Grover Mundell, Aurora, CO (US)

(73) Assignee: West Services, Inc., Eagan, MN (US)

( * ) Notice: Subject to any disclaimer, the term of this patent is extended or adjusted under 35 U.S.C. 154(b) by 1171 days.

(21) Appl. No.: 10/948,889

(22) Filed: Sep. 23, 2004

(65) Prior Publication Data

US 2005/0086596 A1 Apr. 21, 2005

Related U.S. Application Data

(60) Provisional application No. 60/507,056, filed on Sep. 26, 2003.

(51) Int. Cl.
*G06F 17/00* (2006.01)
(52) U.S. Cl. ........................................................ 715/255
(58) Field of Classification Search .................. 715/505, 715/513; 726/27, 29
See application file for complete search history.

(56) References Cited

U.S. PATENT DOCUMENTS

| | | | |
|---|---|---|---|
| 6,405,225 B1 * | 6/2002 | Apfel et al. ................... 715/526 |
| 6,574,636 B1 * | 6/2003 | Balon et al. ............... 707/103 R |
| 6,613,098 B1 * | 9/2003 | Sorge et al. .................... 715/503 |
| 6,691,281 B1 * | 2/2004 | Sorge et al. .................... 715/503 |
| 2002/0174417 A1 * | 11/2002 | Sijacic et al. ................. 717/147 |
| 2004/0039934 A1 * | 2/2004 | Land et al. ..................... 713/200 |
| 2004/0230891 A1 * | 11/2004 | Pravetz et al. ................ 715/511 |
| 2005/0075964 A1 * | 4/2005 | Quinn et al. ..................... 705/37 |

OTHER PUBLICATIONS

Marshall, Dave, "Remote Procedure Calls (RPC)" Jan. 5, 1999 http://web.archive.org/web/20001030133518/http://www.cs.cf.ac.uk/Dave/C/node33.html.*

* cited by examiner

*Primary Examiner* — Adam M. Queler
(74) *Attorney, Agent, or Firm* — Holland & Hart LLP

(57) ABSTRACT

An electronic file such as an HTML web page accessible via a browser by a user. The electronic file may include one or more textual field descriptors for display within the browser; one or more editable data fields associated with the textual field descriptors, the editable data fields for receiving data for the user of the browser; and a module having a view mode and an edit mode, the view mode for displaying the textual field descriptors, the edit mode for permitting the user to enter data in the editable data fields. In one example, the view mode may be invoked when the electronic file is open in the browser. The edit mode may be invoked only if the browser contains a control for activating the edit mode. In this way, the user is able to edit the data in the document and retransmit the document to other users who can only view the data as read-only data.

10 Claims, 6 Drawing Sheets

FIG.5

TURN IN SHEET
REPORTER NAME:
DATE OF PROCEEDING: ☐ JOB SHEET NO: ☐ JOB REFERENCE NO: _____ ← FIELD DESCRIPTOR 506
ESTIMATED PAGES: ☐ WITNESS _____

JOB INFORMATION

APPEARANCE FEE                          EXPERT
CQ OR WRITTEN QUESTIONS                 PARKING $
DEPO(S)                                 TIMESTAMPING
TAPE TRANSCRIPTION                      TRAVEL (MP) $
HEARING                                 TRAVEL (REPORTER) $
NONAPPEARANCE AFFIDAVIT                 MILEAGE
NOT TRANSCRIBED                         VIDEO
EXHIBIT NOS.                            VIDEO OTHERS
EXHIBITS (COLOR) NOS.                   IN-HOUSE PROOFREADING
EXHIBITS (RETAINED) NOS.                IN-HOUSE SCOPING
EXCERPT

} VARIOUS EDITABLE FIELDS 604

CASE STYLE

*SPECIAL INSTRUCTIONS/NOTES: * ← FIELD DESCRIPTORS 506

NUMBER OF DAYS FOR SIGNATURE:
20  30  WAIVED  N/A
NOTE:

SEND ORIGINAL FOR SIGNATURE TO:

BILL O & 1 TO:

ROUGH ASCII FOR PGS
FINAL ASCII
CONDENSED
CONDENSED (IN LIEU OF FULL-SIZED)
REALTIME HOOKUP FOR HRS
EXHIBIT(S)
DELIVER
MAIL
E-TRANSCRIPT TO:
COD
STANDARD DELIVERY
EXPEDITED DELIVERY: DAYS
MISC:

← EDITABLE FIELDS 604

← 602 FILE OR DOCUMENT

FIG.6

ELECTRONIC DOCUMENT WITH SELECTIVELY EDITABLE FIELDS AND METHODS FOR SAME

The application claims priority to U.S. Provisional Application 60/507,056, filed Sep. 26, 2003, titled the same and incorporated herein as if set out in full.

FIELD OF THE INVENTION

The present invention relates, in general, to electronic documents displayable on networked computer systems, and more particularly, to electronic documents that may be used by court reporters to describe transcript projects.

BACKGROUND OF THE INVENTION

In network systems such as the Internet, it is common for web pages or electronic documents provided on web pages to have one or more data fields for receiving data from a user viewing the web page.

Traditionally, a user visits a website which displays an HTML page with a form. When the form is completed by the user, the data is sent back over the network to the server, and at the server is acted upon or stored.

For example a company's website may have a web page which queries customers for information, and upon the customer completing the data in the web page, the web page along with the data is transmitted back to the company's server and stored at the server.

In these instances, however, all users with a computer and network browser are able to enter data into the web pages as they desire. However, as recognized by the present inventors, there may be instances where a company wishes to provide a user with a form that only a particular user or set of users can enter data into, such that after the user has entered data into the form, the form may be retransmitted by the user to one or more entities which may view the form and data in a read-only manner. Accordingly, what is needed is an electronic document with selectively editable fields that may be edited by only particular users.

It is against this background that various embodiments of the present invention were developed.

SUMMARY OF THE INVENTION

In light of the above and according to one broad aspect of one embodiment of the invention, disclosed herein is an electronic document, such as an HTML web page, with editable fields that has invokable functions embedded therein for writing data to the fields only by users who have editing modules which can call the invokable functions to edit the fields of the document. The document may be viewed, but not edited, by other users.

According to another embodiment, disclosed herein is an electronic file, such as an HTML document or file, accessible via a browser by a user. In one example, the electronic file is capable of storing data received from a user within the HTML document, and may include one or more textual field descriptors for display within the browser; one or more editable data fields associated with the textual field descriptors, the editable data fields for receiving data for the user of the browser; and one or more modules providing or including a view mode/read function and an edit mode/write function, the view mode/read function for displaying the textual field descriptors, the edit mode/write function for permitting the user to enter data in the editable data fields to be stored within the HTML document.

In one example, the view mode/read function may be invoked, by default if desired, when the electronic file is open in a browser. In one example, the edit mode/write function may be invoked only if the browser contains a control or module for activating the edit mode or calling the write function embedded within the HTML page. When the edit mode/write function is invoked, the edit module of the HTML page may accept data input from the user into the one or more editable data fields. After the edit mode/write function is invoked, the data input from the user may be stored into a data structure such as one or more XML data islands within the HTML page.

In one example, after data input from the user is stored into the electronic file and the user transmits the electronic file to another user, the view mode displays the textual field descriptors and the data as read-only data in the editable text fields.

Hence, the user is able to edit the data in the HTML document, store the data within the HTML document, and retransmit the HTML document to other users who can only view the data as read-only data. For instance, the document may be embodied as an electronic turn-in sheet or electronic form used by court reporters to provide data and information about court reporting projects and transcripts. In this example, a court reporting company may provide the turn-in sheet to the court reporter over a network, and the court reporter can edit the editable data fields of the turn-in sheet, save the data in the turn-in sheet, and re-transmit the turn-in sheet to other parties who can view the turn-in sheet and data therein as read-only.

Other embodiments of the invention are disclosed herein. The foregoing and other features, utilities and advantages of various embodiments of the invention will be apparent from the following more particular description of the various embodiments of the invention as illustrated in the accompanying drawings and claims.

BRIEF DESCRIPTION OF THE DRAWINGS

FIG. 5 illustrates an example of a document having fields which may be completed by a court reporter, in accordance with one embodiment of the present invention.

FIG. 6 illustrates another example of a document which a court reporter may view and edit using a browser, in accordance with one embodiment of the present invention.

DETAILED DESCRIPTION

Disclosed herein is a web page or file which may be viewed by users through, for instance, a browser, and if the users have certain edit modules present in their browser or local software, then the users may edit the file and retransmit the edited file to other receivers, such as servers, workstations, desktop computers, laptop computers, or the like. Through the use of such a web page or file, multiple users may view a particular web page or file, and certain particular users may be selected or given the capability of editing the file or document and retransmitting the edited file or document so that other users in a network can view, print, or store the file in a read-only fashion. One environment in which embodiments of the present invention may be utilized includes, for example, documents completed by court reporters relating to court reporting transcript projects such as a cover sheet or turn-in sheet that a court reporter can fill in to describe various aspects of a court reporting project. Using embodiments of the present invention, a court reporter can receive an HTML turn-in sheet from a court reporting agency, edit, and then return the HTML turn-in sheet to the court reporting agency so that the court reporting agency can print the cover sheet with the information provided by the court reporter. Various embodiments of the present invention will now be described.

Figure 1:
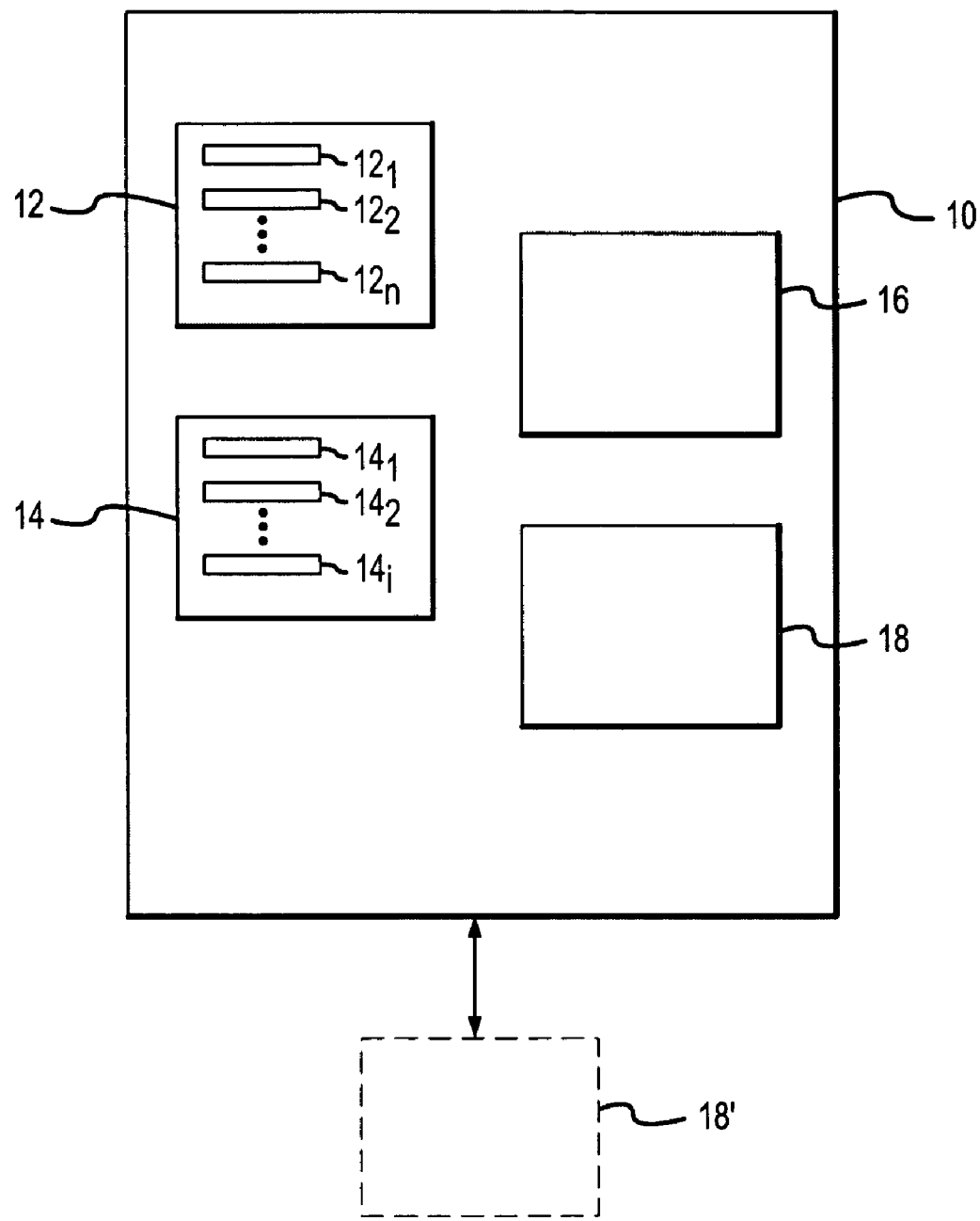
FIG. 1 illustrates a block diagram of one embodiment of the present invention.

Referring to FIG. 1, an electronic document 10, such as, an HTML web page, is illustrated in accordance with an embodiment of the present invention. In one example, the HTML web page/electronic document includes one or more editable fields $12_1$, $12_2$ . . . , $12_n$, for receiving and displaying user entered data; one or more data structures $14_1$, $14_2$ . . . , $14_i$; such as XML data islands, for storing data received from a user or externally. Optionally, the electronic document may include a read function 16 or module embedded in the HTML page/electronic document or a write function 18 or module for writing data into the electronic document 10. Writing data to the electronic document 10 may include save data using a protocol to XML data islands 14. When contained in the electronic document, the read function 16 may be invokable by default whenever the electronic document 10 is accessed, opened, or displayed using, for example, a browser application program or other viewing application program. The read function 16 displays the electronic document 10 using data read from one or more data structures 14, if any data is present therein. Thus, when the electronic document 10 is accessed, opened, or displayed, data written to the data structures 14 is used to populate fields 12.

The write function 18 writes data into one or more of the data structures 14, such as, XML data islands, from or based on data existing, entered, or edited by a user in selectively editable fields 12, or otherwise externally obtained. The write function 18 may be contained in the electronic document 10 as shown in FIG. 1 or exist separately, such as a user's workstation, as shown by write function 18' in phantom. When contained exhibit 1 to the electronic document 10, the write function 18 is invokable externally by a module, program, or application, such as a user program as illustrated in FIG. 1. In the example of a user program in FIG. 1, the user program includes a browser (which may be optional) and an application or module which can call the write function of the HTML page/electronic document.

Hence, in overall operation, the user program, under user control, may launch a browser and load the electronic document 10 therein. The various editable fields of the HTML page are displayed within the browser, and by default, the read function of the HTML page is invoked to display data from the data structures 14 embedded within. Initially, in one example, the data structure 14 may contain initial data (i.e., such as no data, blank data, or default data), so that the electronic document 10 would display the editable fields 12 with blanks or default data therein. Upon user control or automatically, the application or module within the user program for permitting the user to write data to the document would be launched, or activated, which would call the write function 18 or 18' of the electronic document 10. Upon being invoked, the write function 18 or 18' would permit the user to write data into the editable data fields 12, and in one example, when the user closes the document 10 or performs some other actions such as closes the document from an active window, links to another window, actuates a save option, closes the local application, or terminates the connection. The data entered by the user into the editable data fields 12 is stored by the write function 18 or 18' into one or more of the data structures 14.

Because the user data for the editable data fields is now stored in one or more of the data structures 14 within the electronic document, the next time the document 10 is viewed, opened, or accessed or other program, the read function 16 is launched. In one example, launching the read function 16 displays the electronic document 10 with the data read from one or more of the data structures 14 used to populate fields 12. If the user program contains an application module that can call the write function 18 or 18' of the electronic document 10, then the data of the editable data fields 12, to $12_n$ can again be edited, modified, or revised and stored to data structures 14, to $14_i$. However, if the user program does not contain an application or module which can call the write function 18 or 18', then the electronic document 10 with the user data associated in the editable data fields 12 is displayed in a read-only manner.

Figure 2:
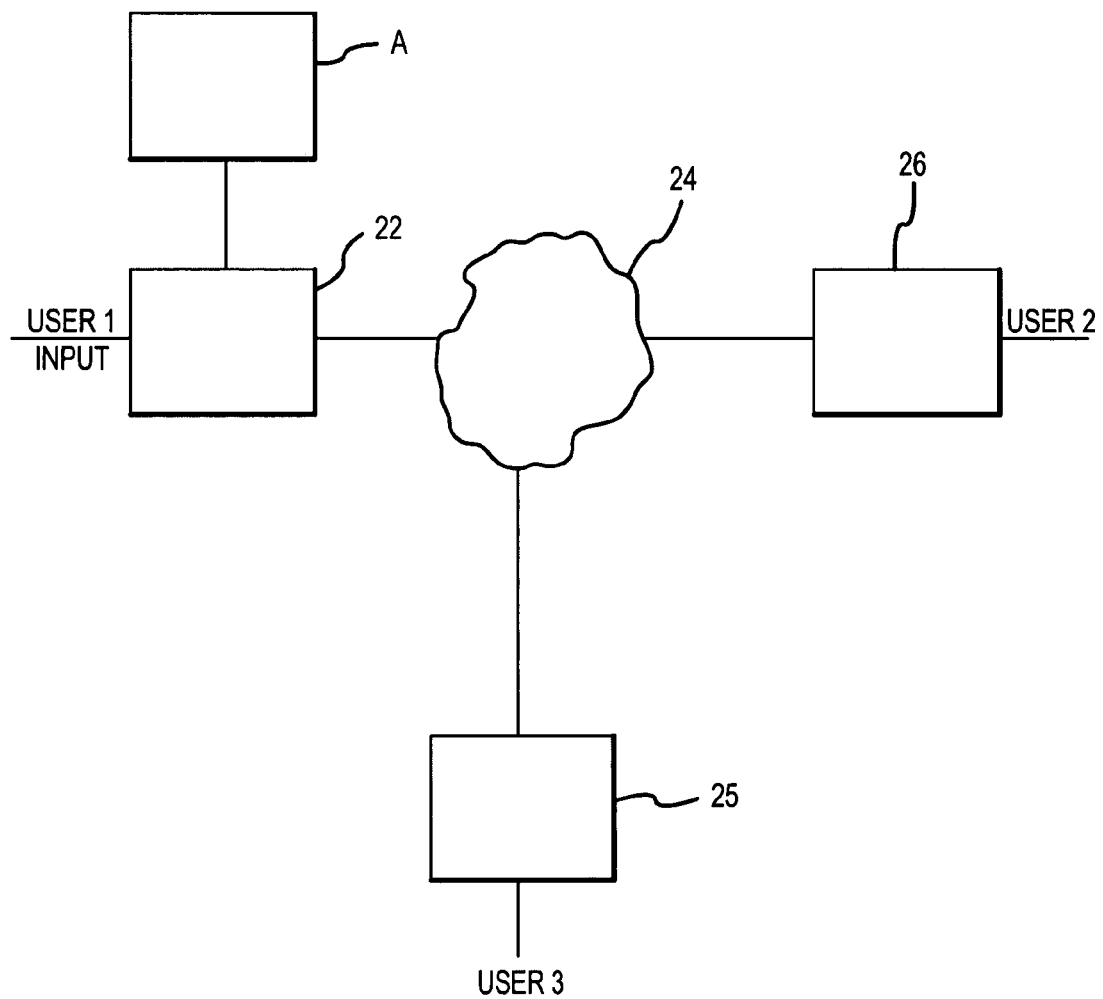
FIG. 2 illustrates a block diagram of one embodiment of the present invention.

Referring to FIG. 2, an electronic document A may be provided or created by user 1 by providing input at a processor 22. As used herein, processor typically includes at least an input device and a display or other output. Process 22 may be connected to a network 24. Document A is typically stored using a memory associated with processor 22 but could be stored at any networked memory. The document may take the form of a computer file, a web page such as an HTML page, a data stream, or other computer usable electronic file or structure. For example, the document may be embodied as an HTML file for transmission over network 24, such as, the Internet although network 24 could be any of the Internet, a LAN, AWAN, AWLAN, WiFi, optical network, or the like. In one example, the document is an HTML file which contains one or more data fields that may be selectively editable by users having the appropriate editing module locally on their computing system, as will be further explained below. In this way, when a user having such editing modules receives the document, the particular user may fill in, edit, or complete, one or more of the editable data fields, and the data is then embedded within the document so that the document can be stored, transmitted or the like and viewed by other users in the network. Other users will only be capable of editing the data if they have the appropriate modules.

In the example of FIG. 2, document A is accessible over the network 24 by user 2 at processor 26. In accordance with embodiments of the invention, user 2 has a view module for viewing the document on processor 26. The view module may invoke the read function 16 in the document 10 or a read function located elsewhere in the network. For instance, the viewing module may be a conventional browser software program or other software adapted for receiving, outputting, or displaying document A. Processor 26 may include, in this example, a module for editing the editable fields of document A. In one example, user 2 has a module which is capable of invoking or calling an editing or write function that is embedded in document A, similar to how user 1 would use processor 22. After user 2 has completed viewing and editing the editable fields of document A, the edited data is stored in the data structures 14 associated with document A and user 2 may then store or transmit the document A, including the edits from user 2, over the network to other users such as user 3 connected to network 24. User 3 accesses document A via network 24 by processor 28. Notice, while each user is shown using a separate processor, user 3 could access document A at processor 26, but user 3 could only have user 3 associate view and/or edit capability. In this example, user 3 is provided only with the view software (for instance, a browser) such that user 3 can view, store, and print document A with the edits from user 1 and/or user 2, but because user 3 is not provided with an edit module, then user 3 would not have the capability of modifying document A. Accordingly, as shown in FIG. 1, embodiments of the present invention permit for the selective filling in, editing, or completing certain fields of a document by a user in a network computer system.

Figure 3:
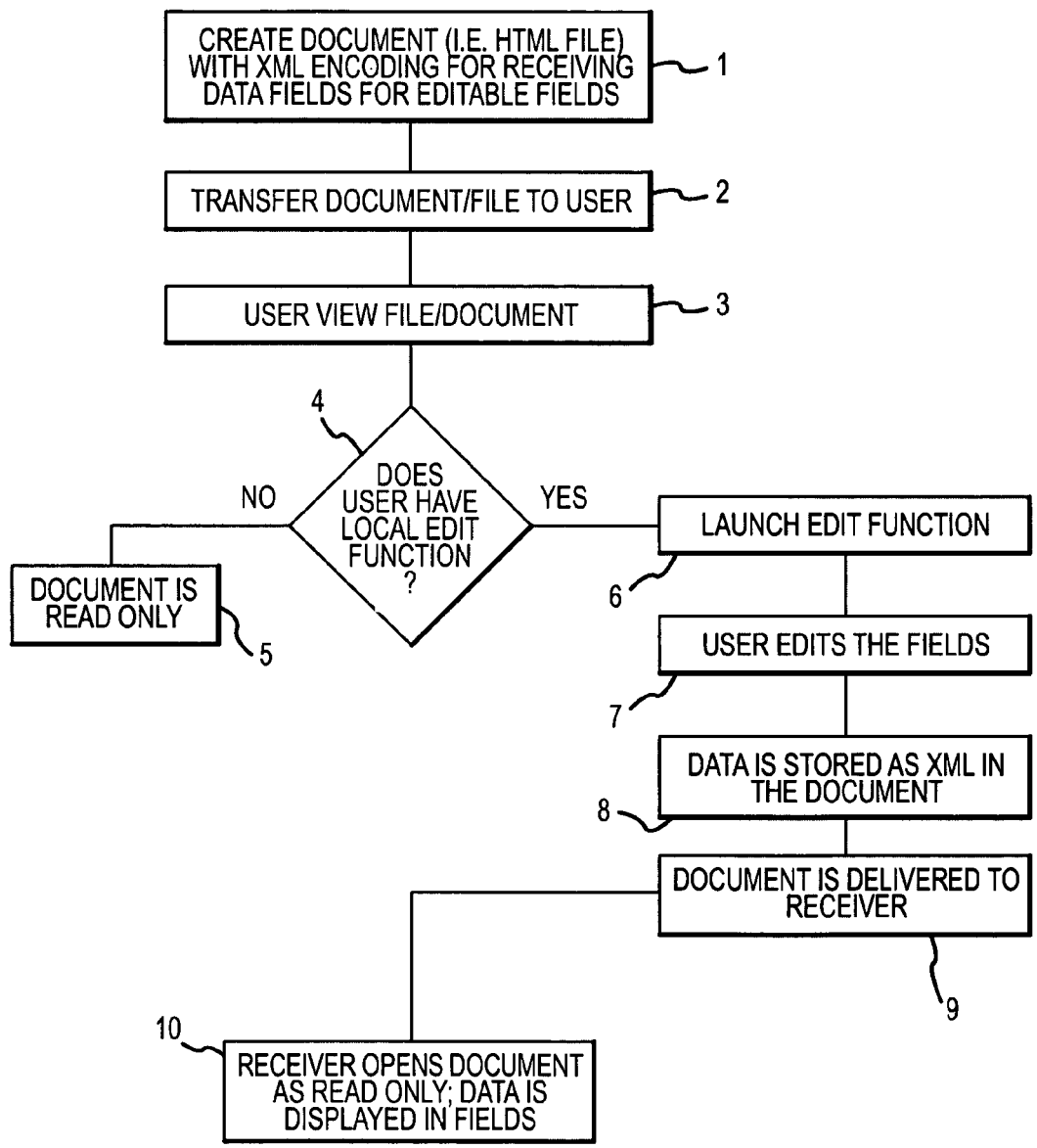
FIG. 3 illustrates an example of the logical operations for creating a document, such as an HTML file, which may be viewed or edited by certain users in a network, in accordance with one embodiment of the present invention.

FIG. 3 illustrates an example of a process for utilizing a document created in accordance with the present invention. At operation 1, a document, such as an HTML file shown in the example of FIG. 1, is created using, for example, XML encoding for receiving data to be associated with particular editable data fields. At operation 2, the document or file is transferred to a user for completion or entry of the data into the data fields. In one example, the file may be transferred over a network such as the Internet, or over other networks or communication media such as wireless, serial communications, parallel communications, or the like. At operation 3, upon receiving the document or file, the user may view the document or file on the user's computing system. In one example, the user may utilize a conventional web browser program to open the file (i.e., for instance, if the file is an HTML page). At decision operation 4, if the user has a module (i.e., locally) that can invoke an edit function in the HTML document for editing the editable data field in the document, then control is passed to operation 6. Alternatively, the edit function associated with the file/document may be invoked if the user has the appropriate authority, passwords, or the like. For instance, if the user's software contains a module for calling or involving a write or edit function is the HTML page, then operation 4 passes control to operation 6. If not, then at operation 5, the document is a read-only document for this particular user and the user is only able to display or store the document using the user's computing system.

However, if the user has an editing module for calling or invoking editing of the editable data fields of the document, then operation 4 passes control to operation 6 wherein the edit function is launched or activated so that the user may edit the editable data fields of the document. At operation 7, the user edits the editable fields of the document as the user desires. At operation 8, when the user has completed the edits to the document, the data provided by the user at operation 7 is stored or resaved in the file document or page.

In one example, when the document is closed by the user, the edit module (i.e., the JAVA script function) and the editable fields are rebuilt as having the data provided by the user at operation 7 associated with the particular editable fields to which the data corresponds, and for example the rebuilding may be performed using an XML data structure, such as XML data islands. In one example, the XML data structure is then read from the document, and based on the XML data structure, the HTML file is rewritten to include the new XML data.

At operation 9, the user may transmit the document (i.e., the HTML file) with the imbedded data to an intended receiver, entity, or other user, in the network. At operation 10, the intended receiver of the document as transmitted by operation 9 receives the document for viewing. Preferably, the receiver opens the document using a web browser or other viewing software and the document, including the data provided by the user at operation 7, is displayed in the document within the appropriate fields. In one example, the fields are automatically populated from the imbedded XML data structure, and a JAVA script function may be activated in order to populate the form elements of the document with the data from the XML data structure.

Figure 4:
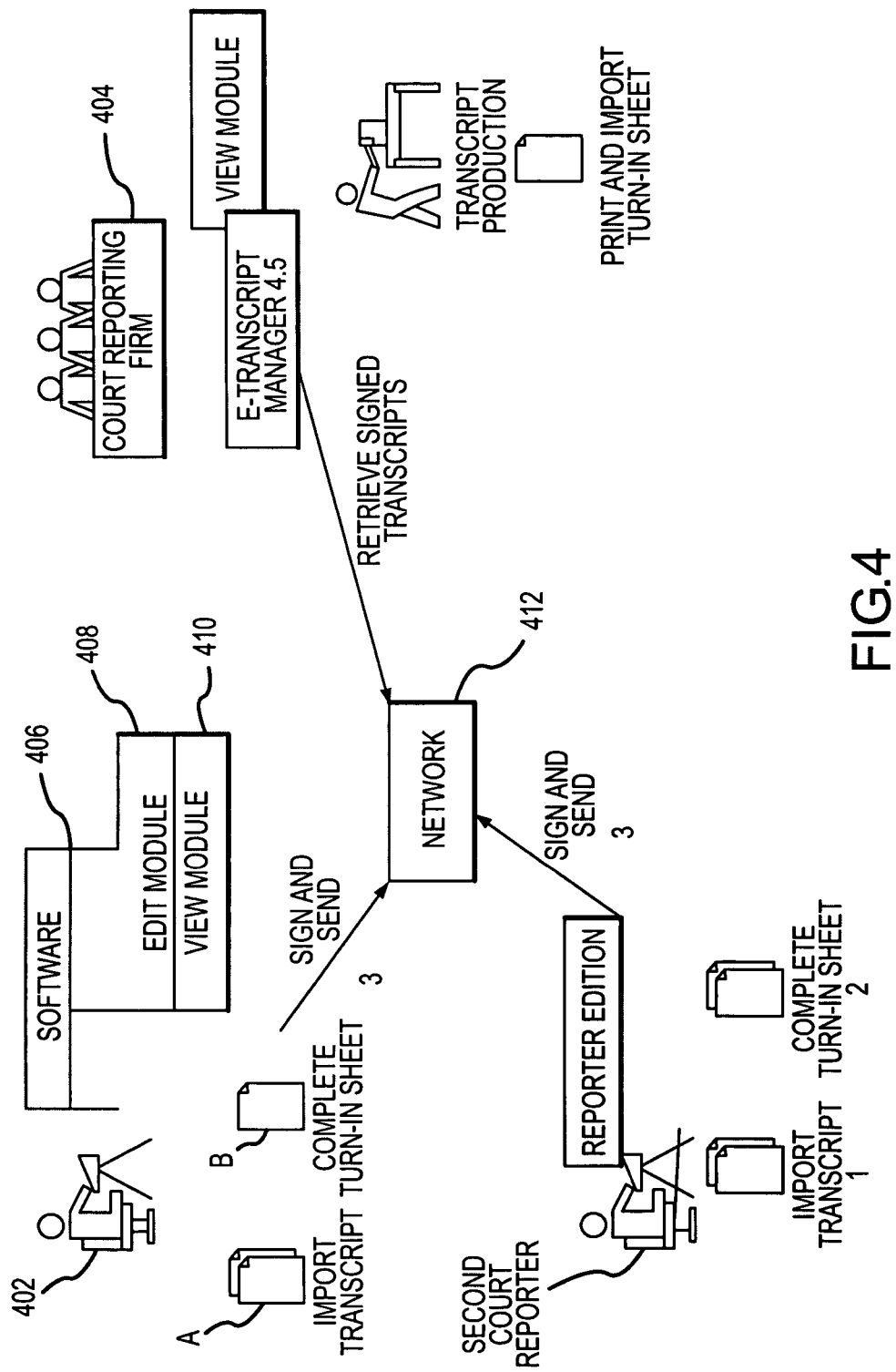
FIG. 4 illustrates an example of a network of court reporters and court reporting firms, wherein embodiments of the present invention may be utilized.

FIG. 4 illustrates an example wherein a first court reporter 402 may use embodiments of the present invention. In the example of FIG. 4, the first court reporter 402 generates and completes an electronic transcript file A, along with a document, shown as a "turn-in" sheet B that reporter 402 may create and use in accordance with embodiments of the present invention. The turn-in sheet B may be created or provided by the court reporting firm 404 so that the court reporter may complete and customize the editable data fields of the turn-in sheet. In this example, the court reporting firm 404 provides the first court reporter 402 with software 406 including a view module 408 for viewing the turn-in sheet B and an edit module 410 which permits the first court reporter 402 to edit the editable fields of the turn-in sheet B. Upon completion of the turn-in sheet B, the first court reporter 402 closes the software editing function to save the data entered by the first court reporter 402 into the turn-in sheet B (as explained more completely in conjunction with FIGS. 2 and 3). The first court reporter 402 may transmit the turn-in sheet B, along with the electronic transcript A, to the court reporting firm 404 via a network 412 so that the court reporting firm can receive the electronic transcript A and the completed turn-in sheet B associated with the electronic transcript A. In one example, if the court reporting firm has software missing an edit module for editing the turn-in sheet B, then the court reporting firm 404 may view the turn-in sheet B in a read-only mode. Without editing modules or authority, the court reporting firm 404 can view or print the turn-in sheet B and provide the turn-in sheet B with the electronic transcript to the intended recipients of the transcript. Alternatively as explained above, the electronic transcript A and turn-in sheet B may be transmitted over the network to other specific recipients as desired. However, unless the other recipients are provided with an edit module 408 for editing the turn-in sheet B, these other recipients will not be able to edit the editable data fields of the turn-in sheet. FIG. 4 also shows a second court reporter 414 with a similar setup as the first court reporter 412. Conventional security or password protocols can be used to inhibit reporter 414 from editing reporter 402's documents.

Figure 5:
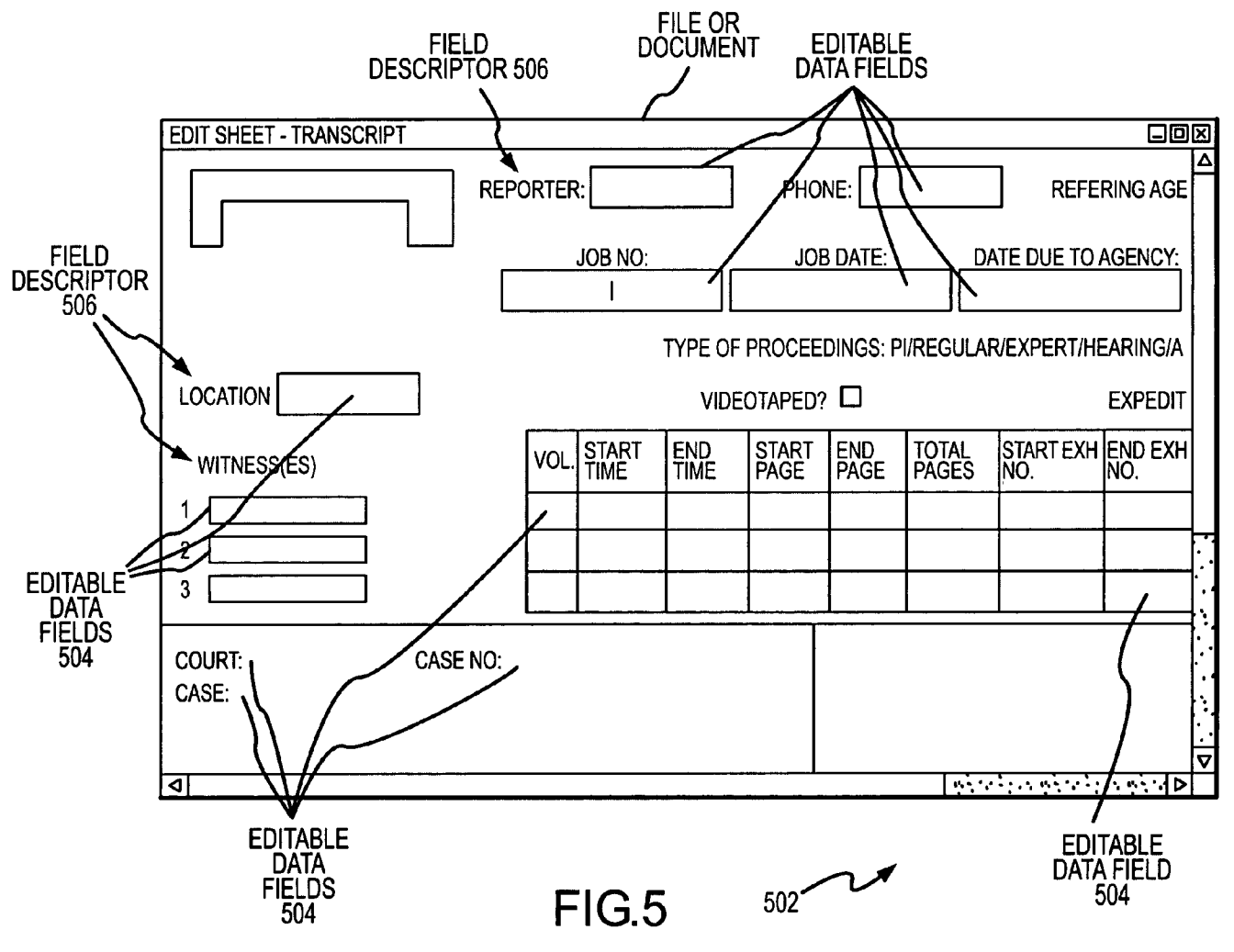

FIGS. 5 and 6 illustrate different examples of a file 502, 602 or document having a plurality of different editable data fields 504, 604 that can be completed or filled in. In examples of FIGS. 5 and 6, files 502, 602 comprise the turn-in sheets B, identified above, and include a plurality of field descriptors 506, 606 and editable data fields 504, 604 that relate to various elements of a court reporting or transcription project, such as the reporter's name, phone number, the date of the job, the job number, the location, the witnesses involved in the transcription, and other fields as shown in FIGS. 5 and 6.

The attached Appendix A contains one example of an embodiment of the present invention and contains the files "EditSheetDlg.cpp" and "sheet.htm." It is understood that the implementations contained in these files are by way of example and do not limit the scope of the invention.

"EditSheetDlg.cpp" is a C++ module that imbeddes the browser control (in this case, within a browser such as Internet Explorer™) and contains code segments for invoking modules within the HTML page for re-saving the HTML file and setting the turn-in sheet into an edit mode so that a user may enter data into one or more editable fields. "Sheet.htm" is an example of an HTML file or web page which contains embedded XML code segments and displays the data and displays edit mode.

In the edit mode of the example of Appendix A, a turn-in sheet HTML page can only be edited if a JavaScript function is invoked, otherwise the turn-in sheet document is read-only. When opened in a browser, the turn-in sheet document is read-only by default. When opened in a program that contains functions from EditSheetDLG.cpp, then the turn-in sheet document can be edited.

In one example when a turn-in sheet is viewed, the fields are automatically populated with data from the imbedded XML data structure. A JavaScript function is triggered on loading of the page to accomplish population of the fields of the turn-in sheet document.

In one example when the turn-in sheet document is closed, a JavaScript function is triggered to collect form data and rebuilds a new XML data structure. Then the EditSheet-Dlg.cpp code which controls an embedded browser instance (i.e., within Internet Explorer) reads the XML from the document DOM (Document Object Model, which is the specification for how objects in a Web page (text, images, headers, links, etc.) are represented) and re-writes the HTML file to include the new XML data.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While the methods disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. An electronic file stored on a computer-readable medium and accessible via a browser by a user, comprising:
   one or more textual field descriptors for display within said browser;
   one or more editable data fields associated with said textual field descriptors, said editable data fields for receiving data for the user of said browser; and
   a module having a view mode and an edit mode, said view mode for displaying said textual field descriptors, said edit mode invoked when said browser contains a control for activating said edit mode and for permitting the user to enter data in the editable data fields;
   wherein when the electronic file is displayed by said browser, said view mode is invoked and the textual field descriptors and the data are displayed as read-only data when said browser does not contain the control for activating said edit mode.

2. The electronic file of claim 1, wherein when the electronic file is displayed by said browser, said edit mode is invoked only if said browser contains the control for activating said edit mode and the control for activating said edit mode is launched by said browser.

3. The electronic file of claim 2, wherein the module accesses a write function when said edit mode is invoked, said write function accessible by the electronic file over a network.

4. The electronic file of claim 1, wherein when the edit mode is invoked, the module accepts data input from the user into said one or more editable data fields.

5. The electronic file of claim 4, wherein after the edit mode is invoked, the data input from the user is stored into the electronic file.

6. The electronic file of claim 5, wherein after data input from the user is stored into the electronic file and the user transmits the electronic file to another user, the view mode displays the textual field descriptors and the data as read-only data in the editable text fields.

7. A method, comprising:
   storing in a memory an electronic file accessible via a browser by a user;
   configuring in said electronic file one or more editable data fields, each associated with one or more textual field descriptors;
   configuring, in said electronic file, a module that is invoked by said browser, said module having a view mode and an edit mode, said view mode for displaying said textual field descriptors, said edit mode for permitting the user to enter data in the editable data fields;
   executing said view mode by said browser to display the data and textual field descriptors of the editable data fields of said electronic file as read-only data; and
   executing said edit mode when a write function is called by said browser and said browser contains a control for activating said edit mode.

8. The method of claim 7, further comprising:
   accepting data input from the user in said executing said edit mode step into said one or more editable data fields when the edit mode is activated.

9. The method of claim 8, further comprising:
   storing the data input from the user into the electronic file after the edit mode is activated.

10. The method of claim 7, further comprising:
    transmitting the electronic file to another user; and
    displaying the textual field descriptors and the data as read-only data in the editable text fields when a browser of the other user does not contain a control for activating said edit mode.

* * * * *